3,718,197
CONVEYOR BELT WEIGHING DEVICE
Hans Barten, Porz-Eil, Rudolf Barnewald, Sinnersdorf, and Werner Hanich, Bergheim, Germany, assignors to Klockner-Humboldt-Deutz Aktiengesellschaft, Cologne, Germany
Filed May 16, 1972, Ser. No. 253,883
Int. Cl. G01g 11/14
U.S. Cl. 177—16                      4 Claims

ABSTRACT OF THE DISCLOSURE

A conveyor belt weighing device suitable for dosing bulk material is provided with an endless conveyor belt guided over two horizontally spaced drums, one of which is a driving drum. The other drum is slidably adjustable lengthwise of the conveyor belt and subjected to the action of helical springs so as to keep the conveyor belt under tension, whereby an indicator attached to one of the springs is movable relative to a fixed scale and permits a direct reading of the tension in said conveyor belt. A weighing member is arranged in the range of the upper strand of the conveyor belt, and the lower strand of the conveyor belt is engaged by two rollers arranged end to end, each having a length of about half the width of the conveyor belt and extend transversely of the belt in a vertical plane parallel to the axes of the drums and at such an angle to each other than the edges of the conveyor belt are disposed in a horizontal plane which is spaced below the center portion of the conveyor belt so as to form a sturdy guide device for the conveyor belt.

---

The invention relates to a conveyor belt weighing device, particularly a dosing belt device, for the weighing and/or dosing of loose or bulk material, which has at one end a driving drum and at the other end a guiding drum for an endless conveyor belt arranged in a framework, and in which between the driving drum and the guiding drum a weighing mechanism is arranged, which comprises two boundary rollers and a measuring roller disposed between the boundary rollers.

In such conveyor belt weighing devices, particularly in dosing or measuring belt weighing devices, it is of importance for the maintenance of the accuracy of the weighing operation that the conveyed material is under constant tension. This was previously attained in that the guiding or deflecting drum was connected with a weight-loaded lever mechanism. Since now the conveyor belt is subjected to a certain wear and from time to time must be exchanged, it was found to be a disadvantage, that in the known devices an absolute indication of belt tension is not immediately possible. Upon a change in the belt, time-consuming adjustment operations have to be performed.

It is an object of the invention to furnish a conveyor belt weighing device, particularly a dosing belt weighing device which overcomes the disadvantages of the known construction. This is accomplished in accordance with the invention in that the deflecting drum is supported longitudinally slidably in the framework containing the endless belt and is subjected to spring elements, advantageously helical springs acting with respect to the framework in longitudinal direction of the same. Such a construction of the conveyor belt weighing device, as compared with weight loaded belt tension devices has the advantage that the belt tension is stabilized and that the measuring accuracy, particularly in the case of a dosing belt weighing device, may be improved. In addition, a simpler belt guidance is obtained.

The invention provide that the slidable end of at least one spring element is equipped with an indicator through which by means of a scale fixed to the framework of the device effective spring force may be read directly. Accordingly a direct indication of the belt tension through the known spring constants of the spring element is obtained, so that upon an exchange of the conveyor belt, the conveyor belt weighing device is again ready for operation in the shortest time without time consuming standard calibration. In connection with this construction, it is desirable that the initial tension of the spring elements is adjustable.

The invention provides further that in the lower strand of the conveyor belt a belt guiding means is arranged, which consists of at least two adjacent rollers arranged in a vertical plane extending parallel to the axes of the drums, whose outer ends with respect to the imaginary plane of the belt lie lower than the ends of the roller disposed towards the center of the belt. In this manner the lower strand which is in itself plane, receives an upwardly arched form transversely to the belt, and on account of the arrangement of the two deflecting rollers has the form of an inverted V, which upon a shifting to the side, is always guided back again in the center axis of the dosing belt weighing device. Owing to this sturdy and reliable belt guiding device, a good straight guiding of the conveyor belt in cooperation with the spring supported deflection drum is obtained.

The accompanying drawings illustrate by way of example an embodiment of the detail on the basis of drawings of an apparatus of the invention.

Figure 1:
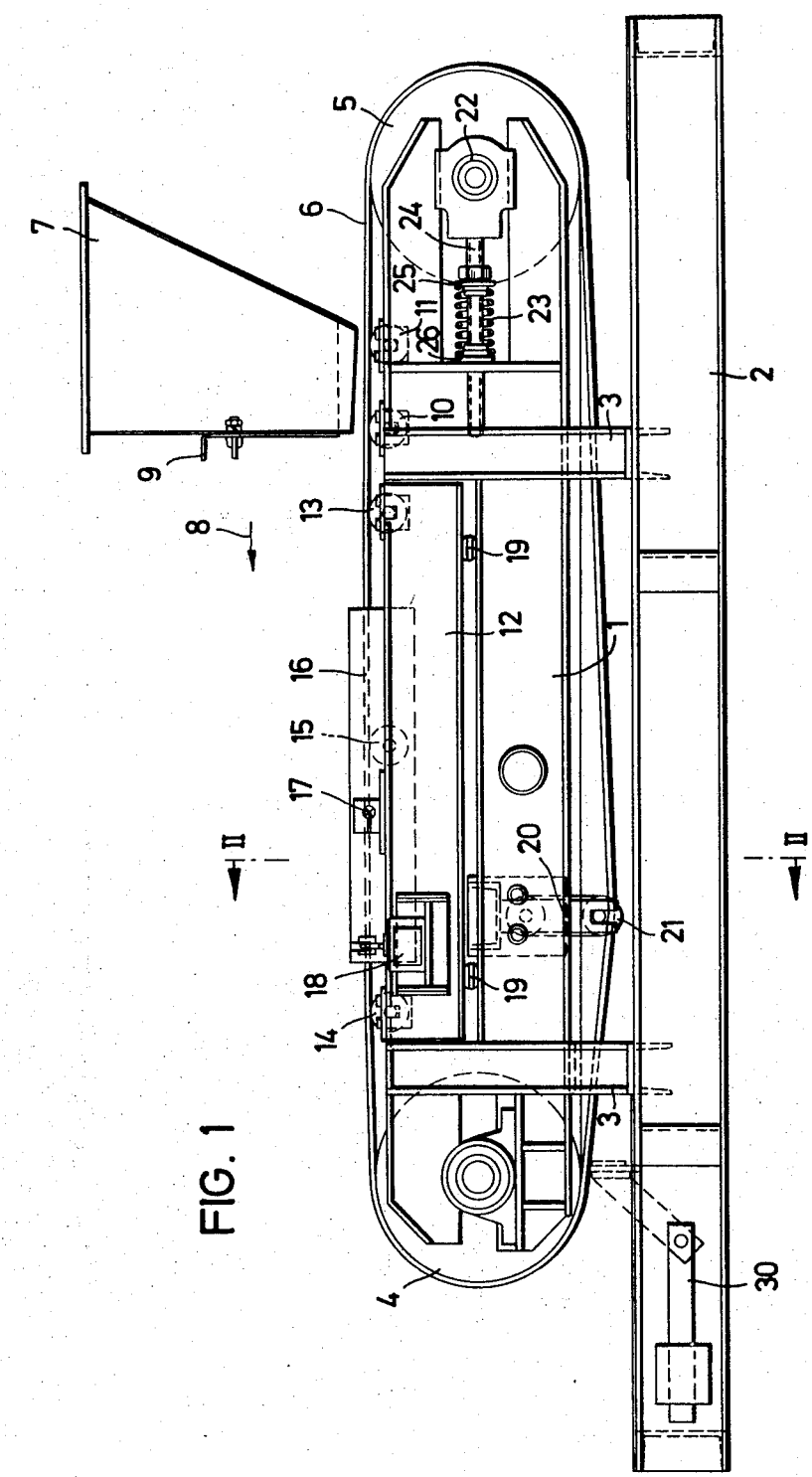
FIG. 1 illustrates in a side elevational view of dosing belt weighing device constructed according to the invention.

Referring to FIG. 1, the dosing or measuring belt weighing device constructed according to the invention is provided with a belt-supporting framework 1, mounted by vertical supports 3 on a foundation. At the ends of the framework are arranged a driving drum 4 and a reflecting drum 5, respectively for an endless conveyor belt 6. The outlet of a bin 7 is arranged above the dosing conveyor belt weighing device, namely adjacent one end thereof, here at the end of the deflecting drum 5. The bin 7 has at its front or in the feed direction indicated by the arrow 8, a vertically movable slide member 9 for the rough regulation of the quantity of the material to be discharged. Directly in the range of the outlet of the bin and below the conveyor belt are positioned two supporting rollers 10 and 11 in the framework which take up the pressure of the material discharged by the bin and placed on the conveyor belt.

The weighing mechanism is arranged between the driving drum and the deflecting drum 5 in the range of the upper strand of the conveyor belt 6. The weighing mechanism consists of a rigid frame 12 separated from the framework 1, and at each of the two ends of this frame 12 is arranged a boundary roller 13 and 14 respectively, the distance between which constitutes the weighing range. Approximately in the center between the two boundary rollers 13, 14 is located the measuring roller 15. The measuring roller 15 is journaled at one end of a balancer 16 which, in turn, is pivotally supported on the frame 12 by means of a suitable hinged bearing 17, for example a so-called cross-spring-joint so as to be pivotal about a horizontal axis. With respect to the measuring roller on the other end of the balancer, the latter is connected with a so-called pressure gauge 18, which is fixedly attached to the frame 12. The weighing mechanism is so connected with the framework 1, that relative displacements between the framework 1 and the frame 12 of the weighing mechanism are possible without causing a deformation of the frame 12. This is accomplished for example by the arrangement of rubber-metal-elements 19. The weighing mechanism is connected at only three points with the framework 1, for example, so that on the one side of the frame 12 two fastening points are provided, and that on the other side of the conveyor belt only one fastening point is arranged.

Figure 2:
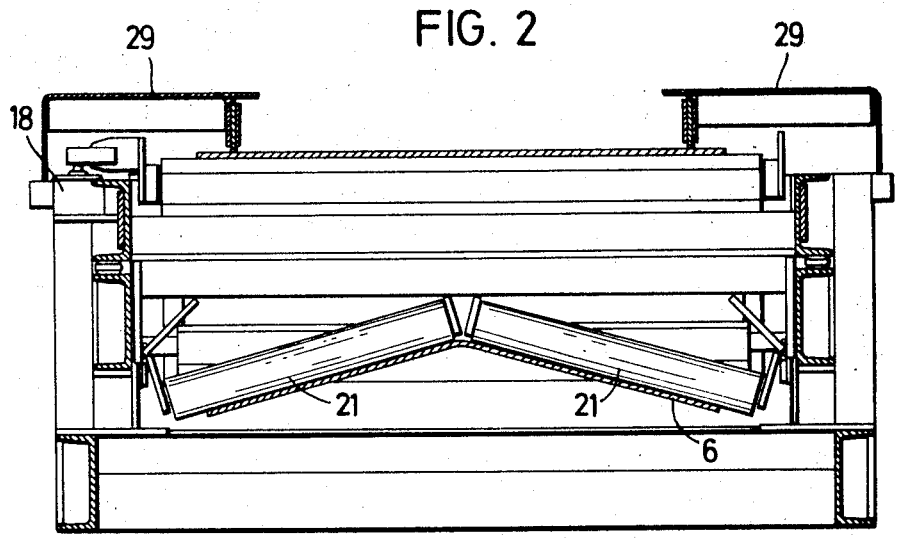
FIG. 2 illustrates a cross-sectional view along the line II—II of FIG. 1.

The lower strand of the conveyor belt 6 is guided over a belt guiding device 20. As shown in FIG. 2, the guiding device consists according to the invention of two rollers 21 arranged end to end adjacent to one another in a vertical plane which is parallel to the two axes of the drums, said rollers being arranged in said vertical plane at an angle to one another, so that the lower strand of the conveyor belt 6 in cross-section is arched or curved upwardly. Through this simple, however sturdy belt guiding device, a reliable lengthwise guiding of the conveyor belt is obtained. Viewed in the direction of travel of the lower strand, in front of the belt guiding device is arranged a weight-loaded belt cleaning device 30, which insures that any material adhering to the belt and also weighed, is likewise discharged. The lateral limitation of the width of the conveyor belt is formed by boundary sheet metal plates 29 which are fixedly secured to the framework 1 (FIG. 2).

The deflecting drum 5 is rotatably supported at both ends in bearing housings 22 which, in turn, are slidably adjustably mounted lengthwise in the framework 1. These bearing housings 22 in the illustrated embodiment, by way of example are supported each by a helical compression spring 23 in the framework in longitudinal direction of the latter. A threaded rod 24 is attached with one of its ends fixedly to the bearing housing 22. This rod carries a pressure plate 25 engaging one end of a helical spring 23 on said rod 24, and backed by a nut 29', while the other end of the spring 23 engages a second pressure plate 26 abutting a wall of said framework. The tension of said spring 23 may be adjusted by a rotation of the nut 29' on said threaded rod 24.

Figure 3:
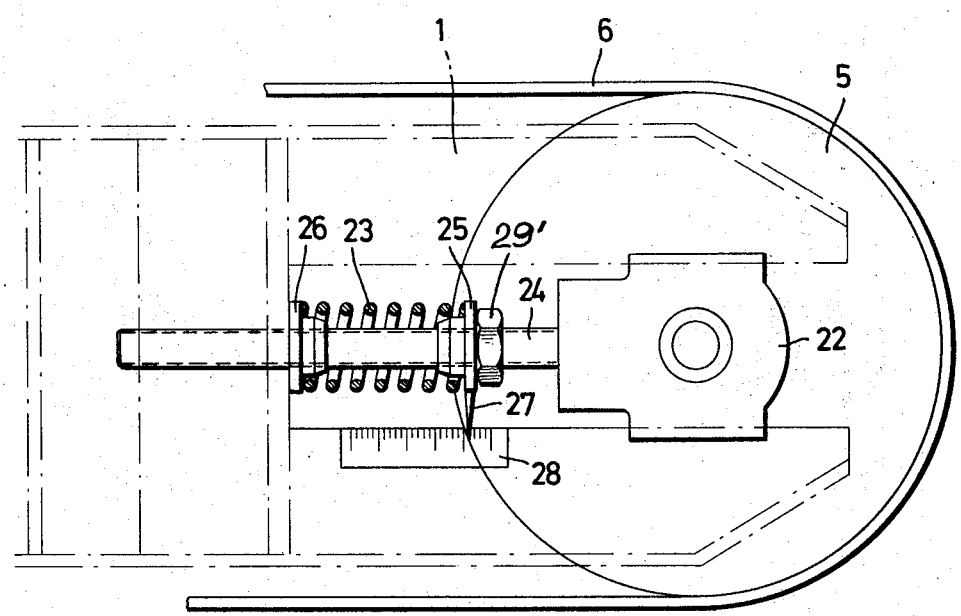
FIG. 3 illustrates the arrangement of the slidable deflecting drum on a somewhat larger scale than in FIG. 1.

FIG. 3 illustrates on a larger scale, that the adjustable end of the helical spring 23 facing the bearing housing 22, may be provided for example on the pressure plate 25 with an indicator 27 which is movable upon adjustment of the pressure plate along a scale 28 fixed to the framework 1 so that the indicator 27 corresponds to the spring characteristic of the compression spring which is employed, and therewith the belt tension may be read directly.

What we claim is:

1. Conveyor belt weighing device, particularly a dosing belt weighing machine for the weighing and dosing of bulk material, comprising a framework, a driving-drum and spaced therefrom a deflecting-drum mounted in said framework, an endless conveyor belt guided over said drums, a weighing member disposed between said driving drum and said deflecting-drum, said weighing member being provided with two boundary rollers and a measuring roller disposed between said boundary rollers, and means for slidably supporting said deflecting drum lengthwise in said framework, said means comprising bearings and spring elements which are yieldable in longitudinal direction of said framework, and indicator means associated with said framework and said spring elements and adapted to indicate the effective spring force.

2. Conveyor belt weighing device, according to claim 1, in which said spring elements comprise helical springs.

3. Conveyor belt weighing device according to claim 1, including means for adjusting the initial tension of said spring elements.

4. Conveyor belt weighing device according to claim 1, in which said weighing member is arranged in the range of the upper strand of said endless conveyor belt, and that the lower strand of said conveyor belt is engaged by a belt guiding means comprising two rollers disposed end to end in a common vertical plane disposed parallel to the axes of said drums and transversely to the longitudinal direction of said conveyor belt and in such a manner that the ends of said rollers disposed adjacent the outer edges of said conveyor belt are disposed in a plane which is spaced below the plane in which the adjacent ends of said rollers in the center portion of said conveyor belt are arranged.

References Cited

UNITED STATES PATENTS

| 1,415,869 | 5/1922 | Fischer | 198—208 U X |
|---|---|---|---|
| 1,582,323 | 4/1926 | Warren | 198—208 U X |
| 2,480,294 | 8/1949 | Hume | 198—208 |
| 3,113,662 | 12/1963 | Jackson | 198—208 |
| 3,559,451 | 2/1971 | Hyer et al. | 177—16 X |

FOREIGN PATENTS

| 424,504 | 2/1935 | Great Britain | 198—208 |

GEORGE H. MILLER, JR., Primary Examiner

U.S. Cl. X.R.

198—208